US008843632B2

(12) United States Patent
Mercuri (10) Patent No.: US 8,843,632 B2
(45) Date of Patent: Sep. 23, 2014

(54) ALLOCATION OF RESOURCES BETWEEN WEB SERVICES IN A COMPOSITE SERVICE

(75) Inventor: Marc Mercuri, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 303 days.

(21) Appl. No.: 12/901,591

(22) Filed: Oct. 11, 2010

(65) Prior Publication Data

US 2012/0089734 A1 Apr. 12, 2012

(51) Int. Cl.
*G06F 15/173* (2006.01)
*G06F 9/50* (2006.01)

(52) U.S. Cl.
CPC .................................... *G06F 9/5055* (2013.01)
USPC .......................................... 709/226; 705/342

(58) Field of Classification Search
USPC .......................................... 709/226; 718/104
See application file for complete search history.

(56) References Cited

U.S. PATENT DOCUMENTS

| | | | |
|---|---|---|---|
| 6,816,907 B1 | 11/2004 | Mei et al. |
| 6,950,848 B1 | 9/2005 | Yousefi'zadeh |
| 7,062,559 B2 | 6/2006 | Yoshimura et al. |
| 7,162,436 B1 | 1/2007 | Eckel, Jr. |
| 7,194,522 B1 | 3/2007 | Swildens et al. |
| 7,269,157 B2 | 9/2007 | Klinker et al. |
| 7,310,684 B2 | 12/2007 | Patrick et al. |
| 7,552,170 B2 | 6/2009 | Owen et al. |
| 7,743,001 B1 | 6/2010 | Vermeulen et al. |
| 7,783,499 B2 | 8/2010 | Boughannam |
| 7,986,707 B2 | 7/2011 | Dettori et al. |
| 8,380,845 B2 | 2/2013 | Mercuri |
| 2002/0194324 A1 | 12/2002 | Guha |
| 2003/0061365 A1 | 3/2003 | White et al. |
| 2003/0115149 A1 | 6/2003 | Dan et al. |
| 2003/0131073 A1 | 7/2003 | Lucovsky et al. |
| 2003/0149735 A1 | 8/2003 | Stark et al. |
| 2004/0064529 A1 | 4/2004 | Meredith et al. |
| 2005/0034001 A1 | 2/2005 | Pontarelli |
| 2005/0038867 A1 | 2/2005 | Henderson et al. |
| 2005/0086330 A1 | 4/2005 | Perham et al. |
| 2005/0172027 A1 | 8/2005 | Castellanos et al. |
| 2005/0251823 A1 | 11/2005 | Saarikivi |
| 2006/0080120 A1 | 4/2006 | Tcherevik |
| 2006/0161554 A1 | 7/2006 | Lucovsky et al. |

(Continued)

OTHER PUBLICATIONS

"Cloud Services Deploy websites, servers and storage on-demand. Only pay for what you need", Retrieved at <<http://tier3.com/cloud-services >>, Jul. 25, 2010, p. 1.

(Continued)

*Primary Examiner* — Thomas Dailey
(74) *Attorney, Agent, or Firm* — Kevin Sullivan; Kate Drakos; Micky Minhas (57) ABSTRACT

Technologies are described herein for allocating resources of a publisher web service to a subscriber web service according to the subscriber web service's SLA type. A request for information is received from a subscriber web service. The request for information may include a SLA type between a publisher web service and the subscriber web service and an identifier of the subscriber web service. The composite service may include the publisher web service and the subscriber web service. A resource allocation associated with the SLA type is retrieved. A set of resources are allocated multiple resources of the publisher web service to the subscriber web service according to the resource allocation and the identifier. The set of resources may be configured to satisfy the request for information.

17 Claims, 3 Drawing Sheets

(56) References Cited

U.S. PATENT DOCUMENTS

| | | | |
|---|---|---|---|
| 2006/0224748 | A1 | 10/2006 | Gupta et al. |
| 2007/0005777 | A1 | 1/2007 | Fremantle et al. |
| 2007/0156813 | A1 | 7/2007 | Galvez et al. |
| 2007/0156919 | A1 | 7/2007 | Potti et al. |
| 2007/0256083 | A1 | 11/2007 | Vayssiere |
| 2008/0080396 | A1 | 4/2008 | Meijer et al. |
| 2008/0080552 | A1 | 4/2008 | Gates et al. |
| 2008/0082693 | A1 | 4/2008 | Meijer et al. |
| 2008/0104393 | A1 | 5/2008 | Glasser et al. |
| 2008/0134043 | A1 | 6/2008 | Georgis et al. |
| 2008/0189243 | A1 | 8/2008 | Li et al. |
| 2008/0235384 | A1 | 9/2008 | Meek et al. |
| 2008/0320497 | A1 | 12/2008 | Tarkoma et al. |
| 2009/0006614 | A1 | 1/2009 | Le et al. |
| 2009/0037896 | A1 | 2/2009 | Grechanik et al. |
| 2009/0048994 | A1 | 2/2009 | Applebaum et al. |
| 2009/0150565 | A1 | 6/2009 | Grossner et al. |
| 2009/0157419 | A1 | 6/2009 | Bursey |
| 2009/0182955 | A1 | 7/2009 | Cherukuri |
| 2009/0196308 | A1 | 8/2009 | Pan et al. |
| 2009/0210528 | A1 | 8/2009 | Swildens et al. |
| 2009/0248693 | A1 | 10/2009 | Sagar et al. |
| 2010/0030866 | A1 | 2/2010 | Bedi |
| 2010/0076856 | A1 | 3/2010 | Mullins |
| 2010/0088150 | A1 | 4/2010 | Mazhar et al. |
| 2010/0131324 | A1* | 5/2010 | Ferris ............................... 705/8 |
| 2010/0131649 | A1 | 5/2010 | Ferris |
| 2010/0153482 | A1 | 6/2010 | Kim et al. |
| 2010/0211782 | A1 | 8/2010 | Auradkar et al. |
| 2010/0299763 | A1 | 11/2010 | Marcus et al. |
| 2011/0231899 | A1* | 9/2011 | Pulier et al. ........................ 726/1 |
| 2011/0238458 | A1 | 9/2011 | Purcell et al. |
| 2011/0276490 | A1* | 11/2011 | Wang et al. ...................... 705/50 |
| 2011/0296022 | A1* | 12/2011 | Ferris et al. ................... 709/226 |
| 2012/0023501 | A1* | 1/2012 | Chi et al. ....................... 718/103 |
| 2012/0066487 | A1 | 3/2012 | Brown et al. |
| 2012/0079490 | A1 | 3/2012 | Bond et al. |
| 2012/0124193 | A1 | 5/2012 | Ebrahim et al. |

OTHER PUBLICATIONS

Franceschini, et al., "Cloud Computing: An Agile Approach to IT", Retrieved Aug. 3, 2010 at << http://www.hds.com/assets/pdf/cloud-computing-an-agile-approach-to-it.pdf >>, p. 1-20.

"Amazon Elastic Compute Cloud (Amazon EC2)", Retrieved at << http://aws.amazon.com/ec2/ >>, Jul. 25, 2010, pp. 13.

"Windows Azure platform", Retrieved at << http://www.microsoft.com/windowsazure/ >>, Jul. 25, 2010, pp. 2.

Partho, Gaea, "Go Grid", Retrieved at << http://blog.taragana.com/index.php/archive/top-10-cloud-computing-service-providers-in-2010/ >>, May 21, 2010, pp. 8.

"Cloud Computing Tiers", Retrieved at << http://www.processor.com/editorial/article.asp?article=articles/P3205/21p05/21p05/21p05.asp&guid= >>, Feb. 26, 2010, vol. 32 No. 5, pp. 4.

"Best Ever Cloud-based Monitoring Service Unveiled", May 31, 2010, Retrieved from http://news.znetindia.com/best-ever-cloud-based-monitoring-service-unveiled.html, 4 pgs.

"Microsoft Windows Azure Cloud Computing Service", Retrieved Aug. 20, 2010 from http://www.itstrategists.com/Microsoft-Azure.aspx, 1 pg.

"SOA Software: Frequently Asked Questions," Retrieved Jul. 26, 2010 from http://www.soa.com/solutions/faqs/, 7 Pages.

"WebMethods X," Dec. 2007, Retrieved from http://www.softwareag.com/fr/images/SAG_XBroker_FS_Dec07-web_tcm46-33852.pdf , 2 pgs.

Braynard, et al., "Opus: an Overlay Peer Utility Service", Aug. 7, 2002, IEEE Proceedings Open Architectures and Network Programming, pp. 167-178.

Buyya et al., "Market-Oriented Cloud Computing: Vision, Hype, and Reality for Delivering IT Services as Computing Utilities", Sep. 25-27, 2008, Proceedings of the 10th IEEE International Conference on High Performance Computing and Communications, HPCC, 9 pgs.

Buyya et al., "Service and Utility Oriented Distributed Computing Systems: Challenges and Opportunities for Modeling and Simulation Communities", Apr. 13-16, 2008, Proceedings of the 41th Annual Simulation Symposium, (ANSS-41), pp. 68-81.

Chandra et al., "Dynamic Resource Allocation for Shared Data Centers Using Online Measurements," 2002, Technical Report, TR02-30, Department of Computer Science, 22 pgs.

Chatterjee, "Messaging Patterns in Service-Oriented Architecture," Apr. 2004, Retrieved from http://msdn.microsoft.com/en-us/library/aa480027.aspx#aj2mpsoarch_topic6, Microsoft Architect Journal, 17 pgs.

Clayman, et al., "Monitoring Service Clouds in the Future Internet", 2010 *Towards the Future Internet*. G. Tselentis et al. (Eds.), IOS Press, p. 115-126.

Fankhauser, et al., "Service Level Agreement Trading for the Differentiated Services Architecture", Nov. 1999, Swiss Federal Institute of Technology, Computer Engineering and Networks Lab, Technical Report, No. 59, 17 pgs.

Hassidim, "Cloud Tools Command Line Framework", Retrieved Aug. 20, 2010 from http://www.gigaspaces.com/wiki/display/CCF/Cloud+Tools+Command+Line+Framework, 7 pgs.

Leung, "Cloud Monitoring Services: A Resource Guide," Feb. 4, 2010, Retrieved at http://www.datacenterknowledge.com/archives/2010/02/04/cloud-monitoring-services-a-resource-guide/, 12 pgs.

Loh, "Automating Cloud Services", Nov. 12, 2009, Retrieved from http://www.tapinsystems.com/downloads/Automating_Cloud_Services.pdf, 14 pgs.

Mitra, "Architecture in practice, Part 5: SOA Scenario 2: Service connectivity options," Dec. 18, 2007, Retrieved from http://www.ibm.com/developerworks/webservices/library/ar-arprac5/index.html, 13 pgs.

Parameswaran et al., "Cloud Interoperability and Standardization," 2009, SETLabs Briefings, vol. 7, No. 7, pp. 19-27.

Taft, "CSC to Resell Microsoft Cloud Services", Jul. 5, 2009, Retrieved from http://www.devsource.com/c/a/Architecture/CSC-to-Resell-Microsoft-Cloud-Services/, 2 pgs.

U.S. Notice of Allowance dated Oct. 15, 2012 in U.S. Appl. No. 12/900,481.

U.S. Official Action dated Nov. 14, 2012 in U.S. Appl. No. 12/907,996.

U.S. Notice of Allowance dated Apr. 2, 2013 in U.S. Appl. No. 12/907,996.

U.S. Official Action dated May 1, 2013 in U.S. Appl. No. 12/907,998.
U.S. Official Action dated Jul. 23, 2013 in U.S. Appl. No. 12/906,144.
U.S. Official Action dated Dec. 4, 2013 in U.S. Appl. No. 12/906,144.
U.S. Official Action dated Nov. 7, 2013 in U.S. Appl. No. 13/764,887.
U.S. Notice of Allowance dated Jun. 26, 2014 in U.S. Appl. No. 12/907,998.
U.S. Notice of Allowance dated May 2, 2014 in U.S. Appl. No. 13/764,887.

* cited by examiner

ALLOCATION OF RESOURCES BETWEEN WEB SERVICES IN A COMPOSITE SERVICE

BACKGROUND

Conventional software applications have generally been installed and executed in a localized computing environment, such as a desktop or enterprise environment. The advancement of increasingly powerful computing devices and expanding data storage capacity in large scale networked data centers has moved consumer and business-oriented applications away from local computing environments to computing environments provided over the Internet or other types of networks, commonly referred to as "cloud-based" computing environments. These applications may be offered as hosted services in the cloud-based computing environment.

As the Internet continues to grow, service providers may continue to offer more diverse hosted services. These hosted services may be offered at various levels, including end user services and various backend services. For example, a hosted service may offer one level of service to one hosted service and offer another level of service to another hosted service. The various levels of service may refer to different allocations of resources, such as processing resources, memory resources, networking resources, and/or the like. Combining these hosted services can yield a composite service. It is difficult, however, to integrate multiple levels of hosted services, especially when these hosted services are offered by different service providers.

It is with respect to these considerations and others that the disclosure made herein is presented.

SUMMARY

Technologies are described herein for allocating resources of a publisher web service to a subscriber web service according to the subscriber web service's service level agreement (SLA) type. A composite service may include multiple web services, such as a first web service and a second web service. The second web service may utilize resources provided by the first web service. In order to utilize resources provided from the first web service, the second web service may subscribe to a level of service (e.g., the SLA type) from the first web service. In this case, the first web service may be referred to as the publisher web service, and the second web service may be referred to as the subscriber web service.

Through the utilization of the technologies and concepts presented herein, the subscriber web service can send a request for information to the publisher web service. The request for information may include an identifier of the subscriber web service. The publisher web service may retrieve the SLA type associated with the identifier of the subscriber web service. The publisher web service may then allocate resources for satisfying the request for information based on the SLA type. In one example, the publisher web service may route the request for information to a server adapted to provide the information. The server can then provide the information directly to the subscriber web service in response to the request for information. In another example, the publisher web service may retrieve a uniform resource locator (URL) based on the SLA type. The URL may correspond to a server configured to provide the information. The subscriber web service can then access the URL in order to retrieve the information.

Example technologies may provide for allocating resources between web services in a composite service. The technologies receive a request for information from a subscriber web service. The request for information may include a SLA type between a publisher web service and the subscriber web service and an identifier of the subscriber web service. The composite service may include the publisher web service and the subscriber web service. The technologies retrieve a resource allocation associated with the SLA type. The technologies allocate a set of resources from multiple resources of the publisher web service to the subscriber web service according to the resource allocation and the identifier. The set of resources may be configured to satisfy the request for information.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for allocating resources of a publisher web service to a subscriber web service according to the subscriber web service's SLA type. In accordance with some embodiments described herein, a composite service may include multiple web services. Each of these web services may be a publisher web service and/or a subscriber web service. A subscriber web service may refer to a web service that utilizes resources provided by a publisher web service. A subscriber web service may be associated with a SLA type corresponding to a particular publisher web service. A publisher web service may allocate resources for each corresponding subscriber web service depending on the subscriber web service's SLA type.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration, specific embodiments, or examples. Referring now to the drawings, in which like numerals represent like elements through the several figures, a computing system and methodology for allocating resources of a publisher web service to a subscriber web service according to the subscriber web service's SLA type will be described.

Figure 1:
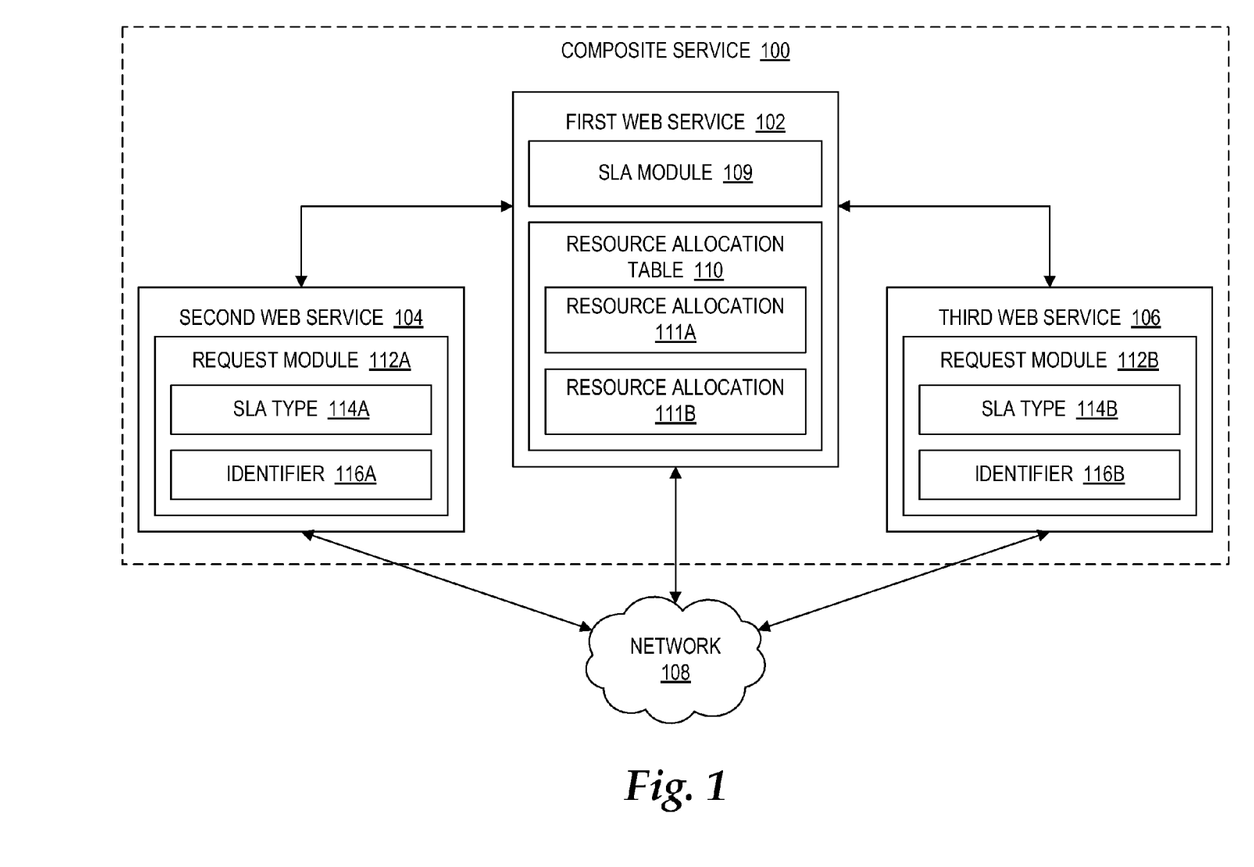
FIG. 1 is a block diagram illustrating a composite service adapted to allocate resources of a publisher web service to a subscriber web service according to the subscriber web service's SLA type, in accordance with some embodiment.

FIG. 1 illustrates a composite service 100 adapted to allocate resources of a publisher web service to a subscriber web service according to the subscriber web service's SLA type, in accordance with some embodiments. The composite service 100 may include a first web service 102, a second web service 104, and a third web service 106. The web services 102-106 may be coupled via a communications network 108. An example of the composite service 100 is the monitoring service described in U.S. patent application Ser. No. 12/900,481, filed Oct. 8, 2010, entitled "Providing a Monitoring Service in a Cloud-Based Computing Environment," which is hereby incorporated by reference in its entirety. Some examples of the web services 102-106 include the various web services (e.g., controller application, monitor application, finder application, analyzer application, notifier application, etc.) also described in the above referenced and incorporated patent application entitled "Providing a Monitoring Service in a Cloud-Based Environment."

The first web service 102 may include a SLA module 109 and resource allocation table 110. The resource allocation table 110 may include a first resource allocation 111A and a second resource allocation 111B. The second web service 104 may include a request module 112A and a SLA type 114A. The third web service 106 may include a request module 112B and a SLA type 114B. In the example illustrated in FIG. 1, the first web service 102 may be referred to as a publisher web service, and the second web service 104 and the third web service 106 may be referred to a subscriber web services. That is, the second web service 104 and the third web service 106 may be configured to utilize resources provided by the first web service 102. The web services 102-106 may each be a publisher web service and/or a subscriber web service, according to various embodiments.

The second web service 104 and the third web service 106 may be associated with different SLA types 114A, 114B and unique identifiers 116A, 116B. The SLA types 114A, 114B may be associated with one or more publisher web services, including the first web service 102. The SLA types 114A, 114B may also be associated with different fees paid by an operator of the second web service 104 and an operator of the third web service 106 to an operator of the first web service 102. In some examples, the SLA types 114A, 114B may be shared with multiple publisher services. In other examples, the SLA types 114A, 114B may be associated with only the first web service 102, while other SLA types may be associated with other publisher web services. In the example illustrated in FIG. 1, the SLA type 114A may correspond to a "platinum" level SLA type, and the SLA type 114B may correspond to a "silver" level SLA type. The platinum level may be associated with a higher allocation of resources than the silver level. It should be appreciated that the platinum level and silver level SLA types are merely illustrative, and other SLA types may be similarly utilized.

In an illustrative example, the first web service 102 may be a search service. In this example, the request modules 112A, 112B may be configured to send a request for information to the SLA module 109. The request for information may include queries, the corresponding SLA types 114A, 114B, and the identifiers 116A, 116B of the second web service 104 and the third web service 106. Upon receiving the request for information, the SLA module 109 may retrieve resource allocations 111A, 111B corresponding to the SLA types 114A, 114B from the resource allocation table 110. For example, the SLA type 114A may correspond to the resource allocation 111A, and the SLA type 114B may correspond to the resource allocation 111B.

The SLA module 109 may then allocate resources for performing the search service to the second web service 104 and the third web service 106 according to the retrieved resource allocations 111A, 111B and the identifiers 116A, 116B. For example, the SLA module 109 may allocate a first set of resources from multiple resources in the first web service 102 to the second web service 104. The SLA module 109 may also allocate a second set of resources from the multiple resources in the first web service 102 to the third web service 106. In some embodiments, the resource allocation table 110 may be stored in the memory of a computer operating the first web service 102. In other embodiments, the resource allocation table 110 may be stored in an external database accessible by a computer operating the first web service 102.

The resources may refer to one or more entities that a publisher web service is capable of allocating to multiple subscriber web services. Such resources may be allocated according to suitable business rules associated with the various SLA types 114A, 114B. In a first embodiment, the resources may refer to servers adapted to retrieve search results corresponding to a query. For example, when the request module 112A sends a query to the SLA module 109, the SLA module 109 may allocate a dedicated server to the second web service 104 according to the platinum level. When the request module 112B sends a query to the SLA module 109, the SLA module 109 may allocate a shared server to the third web service 106 according to the silver level. The shared server may be shared by multiple web services.

The SLA module 109 may allocate the dedicated server and the shared server by sending URLs corresponding to the dedicated server and the shared server to the request modules 112A, 112B. The second web service 104 and the third web service 106 can then utilize the URLs in order to retrieve the search results. Alternatively, the SLA module 109 may route the query directly to the dedicated server and the shared server. The dedicated server and the shared server can then retrieve and provide the search results to the second web service 104 and the third web service 106 without further action from the second web service 104 and the third web service 106.

In a second embodiment, the resources may refer to a level of access. For example, when the request module 112A sends a query to the SLA module 109, the SLA module 109 may assign access to a greater number of search providers to the second web service 104 according to the platinum level. When the request module 112B sends a query to the SLA module 109, the SLA module 109 may assign a lesser number of search providers to the third web service 106 according to the silver level.

In a third embodiment, the resources may refer to bandwidth or other suitable computer resources. For example, when the request module 112A sends a query to the SLA module 109, the SLA module 109 may allocate additional computer resources to the second web service 104 according to the platinum level SLA. When the request module 112B sends a query to the SLA module 109, the SLA module 109 may decrease available computer resources available to the third web service 106 according to the silver level.

In a fourth embodiment, the resources may refer to service availability or uptime. For example, when the request module 112A sends a query to the SLA module 109, the SLA module 109 may allocate a greater time of availability or uptime to the second web service 104 according to the platinum level. When the request module 112B sends a query to the SLA module 109, the SLA module 109 may allocate a lesser time of availability or uptime to the third web service 106 according to the silver level.

In a fifth embodiment, the resources may refer to a response time. For example, when the request module 112A sends a query to the SLA module 109, the SLA module 109 may assign real-time or near real-time access of search results to the second web service 104 according to the platinum level. When the request module 112B sends a query to the SLA module 109, the SLA module 109 may assign delayed access to the third web service 106 according to the silver level.

As previously described, the SLA module 109 may allocate resources according to suitable business rules associated with the various SLA types 114A, 114B. These business rules may account for factors associated with the resources. In one example, where the SLA module 109 routes a query to a particular shared server, the SLA module 109 may account for current server load. In this example, the SLA module 109 may route the query to a shared server having the lowest current load. In another example, where the SLA module 109 routes a query to a particular server, the SLA module 109 may account for current server availability. In this example, the SLA module 109 may route the query to a server having current availability to respond to the query. In yet another example, where the SLA module 109 routes a query to a particular server, the SLA module 109 may account for political requirements. In this example, the SLA module 109 may route the query to a server in China where business rules dictate that Chinese political requirements be met.

Figure 2:
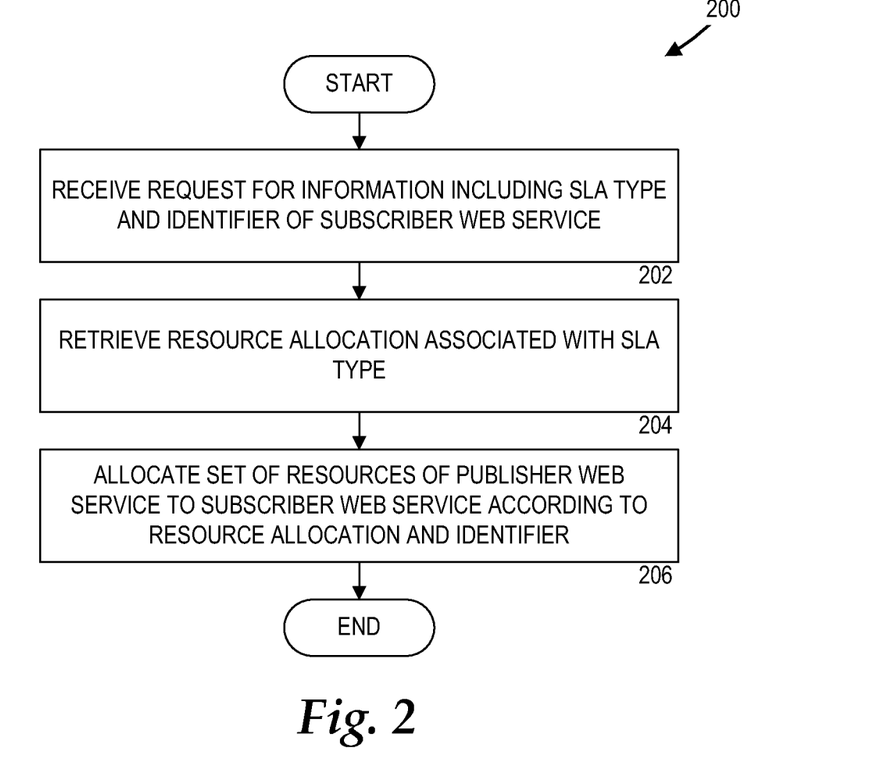
FIG. 2 is a flow diagram illustrating a method for allocating resources of a publisher web service to a subscriber web service according to the subscriber web service's SLA type, in accordance with some embodiments.

Referring now to FIG. 2, additional details regarding the operations of the request modules 112A, 112B and the SLA module 109 will be provided. In particular, FIG. 2 is a flow diagram illustrating a method for allocating resources of a publisher web service to a subscriber web service according to the subscriber web service's SLA type, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2 a routine 200 begins at operation 202, where the SLA module 109 receives a request for information from a subscriber web service, such as the second web service 104. That is, the request module 112A may send the request for information to the SLA module 109. The request for information may include the SLA type 114A and the identifier 116A. The SLA type 114A may specify a level of service agreed between the second web service 104 and the first web service 102. For example, a higher fee paid by an operator of the second web service 104 to an operator of the first web service 102 may correspond to a higher level of service, while a lower fee paid by an operator of the second web service 104 to an operator of the first web service 102 may correspond to a lower level of service. The identifier 116A may identify and/or specify a location of the second web service 104. When the SLA module 109 receives the request for information from the second web service 104, the routine 200 may proceed to operation 204.

At operation 204, the SLA module 109 may retrieve a resource allocation associated with the SLA type 114A. In some embodiments, the SLA module 109 may retrieve the resource allocation 111A corresponding to the SLA type 114A from the resource allocation table 110. The resource allocation table 110 may include multiple SLA types, each of which corresponds to a particular resource allocation. That is, different SLA types may correspond to different resource allocations. When the SLA module 109 retrieves the resource allocation associated with the SLA type 114A, the routine 200 may proceed to operation 206.

At operation 206, the SLA module 109 allocates a set of resources of the first web service 102 to the second web service 104 according to the retrieved resource allocation 111A and the identifier 116A. The first web service 102 may include multiple resources. At least a portion of these resources may form the set of resources allocated to the first web service 102. The SLA module 109 may determine the set of resources based on the retrieved resource allocation 111A. The SLA module 109 may then allocate the set of resources to the second web service 104 as identified by the identifier 116A. When the SLA module 109 allocates the set of resources of the first web service 102 to the second web service 104 according to the retrieved resource allocation 111A and the identifier 116A, the routine 200 may repeat (e.g., periodically, continuously, or on demand as needed) or terminate.

Figure 3:
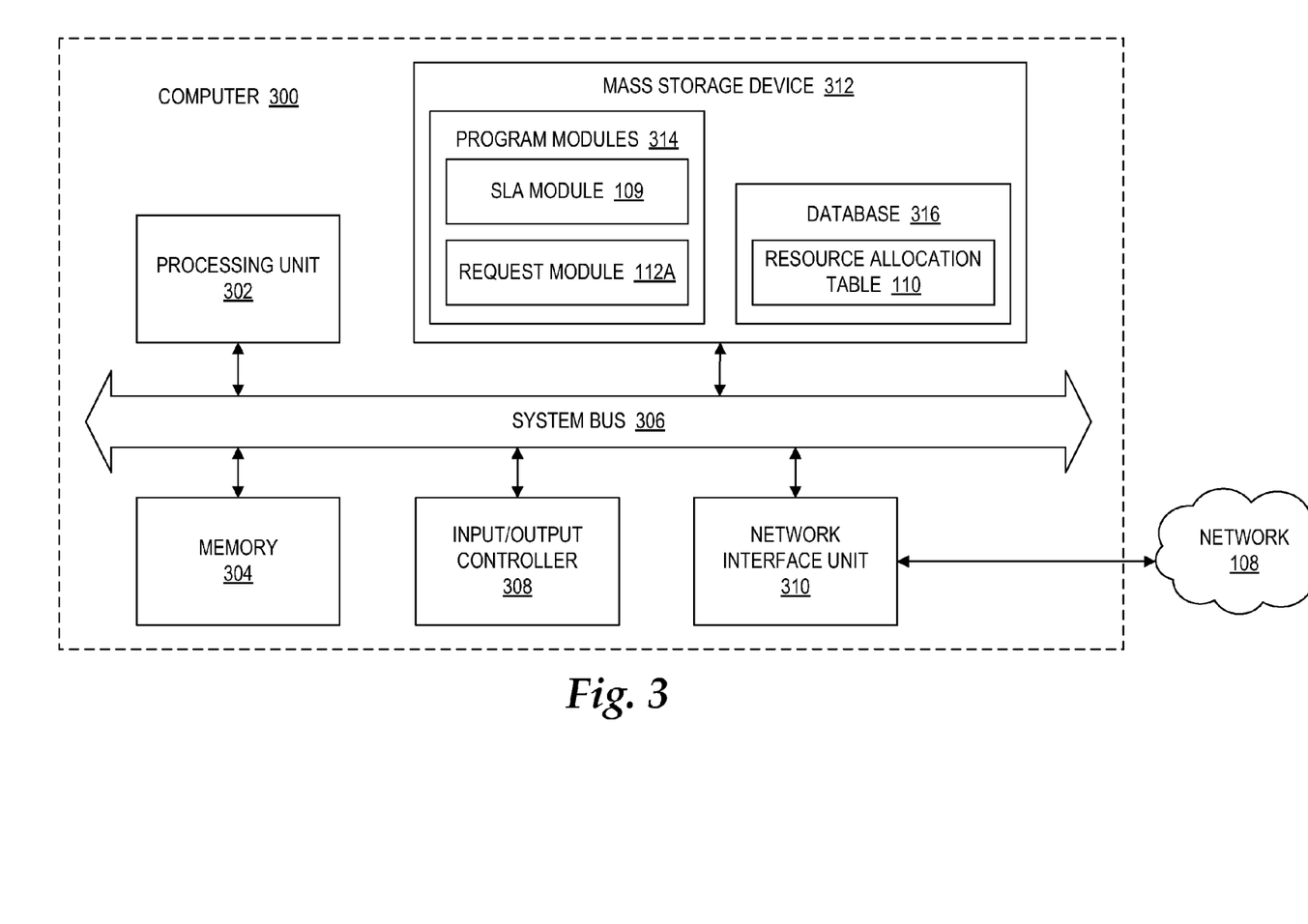
FIG. 3 is a computer architecture diagram showing an illustrative computer hardware architecture for a computing system capable of implementing the embodiments presented herein.

Turning now to FIG. 3, an example computer architecture diagram showing a computer 300 is illustrated. The computer 300 may include a central processing unit 302, a system memory 304, and a system bus 306 that couples the memory 304 to the 302. The computer 300 may further include a mass storage device 312 for storing one or more program modules 314 and the database 316. Examples of the program modules 314 may include the SLA module 109 and the request module 112A. The database 316 may store the resource allocation table 110. The mass storage device 312 may be connected to the processing unit 302 through a mass storage controller (not shown) connected to the bus 306. The mass storage device 312 and its associated computer-storage media may provide non-volatile storage for the computer 300. Although the description of computer-storage media contained herein refers to a mass storage device, such as a hard disk or CD-ROM drive, it should be appreciated by those skilled in the art that computer-storage media can be any available computer storage media that can be accessed by the computer 300.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300.

According to various embodiments, the computer 300 may operate in a networked environment using logical connections to remote computers through a network such as the network 108. The computer 300 may connect to the network 108 through a network interface unit 310 connected to the bus 306. It should be appreciated that the network interface unit 310 may also be utilized to connect to other types of networks and remote computer systems. The computer 300 may also include an input/output controller 308 for receiving and processing input from a number of input devices (not shown), including a keyboard, a mouse, a microphone, and a game controller. Similarly, the input/output controller 308 may provide output to a display or other type of output device (not shown).

The bus 306 may enable the processing unit 302 to read code and/or data to/from the mass storage device 312 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 314 may include software instructions that, when loaded into the processing unit 302 and executed, cause the computer 300 to allocate resources of a publisher web service to a subscriber web service according to the subscriber web service's SLA type. The program modules 314 may also provide various tools or techniques by which the computer 300 may participate within the overall systems or operating environments using the components, flows, and data structures discussed throughout this description. For example, the program modules 314 may implement interfaces for allocating resources of a publisher web service to a subscriber web service according to the subscriber web service's SLA type.

In general, the program modules 314 may, when loaded into the processing unit 302 and executed, transform the processing unit 302 and the overall computer 300 from a general-purpose computing system into a special-purpose computing system customized to allocate resources of a publisher web service to a subscriber web service according to the subscriber web service's SLA type. The processing unit 302 may be constructed from any number of transistors or other discrete circuit elements, which may individually or collectively assume any number of states. More specifically, the processing unit 302 may operate as a finite-state machine, in response to executable instructions contained within the program modules 314. These computer-executable instructions may transform the processing unit 302 by specifying how the processing unit 302 transitions between states, thereby transforming the transistors or other discrete hardware elements constituting the processing unit 302.

Encoding the program modules 314 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 314 may transform the physical state of the semiconductor memory, when the software is encoded therein. For example, the program modules 314 may transform the state of transistors, capacitors, or other discrete circuit elements constituting the semiconductor memory.

As another example, the computer-storage media may be implemented using magnetic or optical technology. In such implementations, the program modules 314 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that technologies for allocating resources of a publisher web service to a subscriber web service according to the subscriber web service's SLA type are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for allocating resources between web services in a composite service, the method comprising computer-implemented operations for:
   receiving a request for information from a subscriber web service, the request for information comprising a service level agreement (SLA) type between a publisher web service and the subscriber web service and an identifier of the subscriber web service, the composite service comprising the publisher web service and the subscriber web service;
   retrieving a resource allocation associated with the SLA type;
   allocating a set of resources from multiple resources of the publisher web service to the subscriber web service according to the resource allocation and the identifier, the set of resources configured to satisfy the request for information by allocating a server based on the SLA type from a plurality of servers associated with the publisher web service to the subscriber web service according to the resource allocation, and routing the request for information to the server.

2. The computer-implemented method of claim 1, further comprising computer-implemented operations for:

receiving a second request for information from a second subscriber web service, the second request for information comprising a second SLA type between the publisher web service and the second subscriber web service and a second identifier of the subscriber web service, the composite service further comprising the second subscriber web service;

retrieving a second resource allocation associated with the second SLA type;

allocating a second set of resources from the multiple resources of the publisher web service to the second subscriber web service according to the second resource allocation and the second identifier by allocating a second server from the plurality of web servers associated with the publisher web service to the second subscriber web service according to the second resource allocation, the second set of resources configured to satisfy the second request for information; and routing the second request for information to the second server.

3. The computer-implemented method of claim 1, wherein allocating the server from a plurality of servers associated with the publisher web service to the subscriber web service according to the resource allocation comprises allocating the server from the plurality of servers associated with the publisher web service to the subscriber web service according to the resource allocation and current loads of the plurality of servers.

4. The computer-implemented method of claim a 1, wherein allocating the server from a plurality of servers associated with the publisher web service to the subscriber web service according to the resource allocation comprises providing a uniform resource locator (URL) adapted to access the server to the subscriber web service.

5. The computer-implemented method of claim 1, wherein allocating the server from a plurality of servers associated with the publisher web service to the subscriber web service according to the resource allocation comprises allocating the server from the plurality of servers associated with the publisher web service to the subscriber web service according to the resource allocation and current availability of the plurality of servers.

6. The computer-implemented method of claim 1, wherein allocating the server from a plurality of servers associated with the publisher web service to the subscriber web service according to the resource allocation comprises allocating the server from the plurality of servers associated with the publisher web service to the subscriber web service according to the resource allocation and political requirements of the subscriber web service.

7. The computer-implemented method of claim 1, wherein retrieving a resource allocation associated with the SLA type comprises retrieving the resource allocation associated with the SLA type from a resource allocation table, the resource allocation table associating each of a plurality of SLA types with one of a plurality of resources allocations.

8. The computer-implemented method of claim 7, wherein each of the plurality of SLA types corresponds to a different fee paid to an operator of the publisher web service.

9. A computer system, comprising:
a processor;
a memory communicatively coupled to the processor; and
a program module which executes in the processor from the memory and which, when executed by the processor, causes the computer system to allocate resources between web services in a composite service by:

receiving a first request for information from a first subscriber web service, the first request for information comprising a first service level agreement (SLA) type between a publisher web service and the first subscriber web service and a first identifier of the first subscriber web service;

receiving a second request for information from a second subscriber web service, the second request for information comprising a second SLA type between the publisher web service and the second subscriber web service and a second identifier of the second subscriber web service, the composite service comprising the publisher web service, the first subscriber web service, and the second subscriber web service;

retrieving a first resource allocation associated with the first SLA type;

retrieving a second resource allocation associated with the second SLA type;

allocating a first set of resources from multiple resources of the publisher web service to the first subscriber web service according to the first resource allocation and the first identifier, the first set of resources configured to satisfy the first request for information by allocating a first server from a plurality of servers associated with the publisher web service to the first subscriber web service according to the first resource allocation;

allocating a second set of resources from the multiple resources of the publisher web service to the second subscriber web service according to the second resource allocation and the second identifier, the second set of resources configured to satisfy the second request for information by allocating a second server from the plurality of servers associated with the publisher web service to the second subscriber web service according to the second resource allocation:

routing the first request for information to the first server; and routing the second request for information to the second server.

10. The computer system of claim 9, wherein allocating the first server from a plurality of servers associated with the publisher web service to the first subscriber web service according to the first resource allocation comprises allocating the first server from the plurality of servers associated with the publisher web service to the first subscriber web service according to the first resource allocation and current loads of the plurality of servers; and wherein allocating the second server from the plurality of servers associated with the publisher web service to the second subscriber web service according to the second resource allocation comprises allocating the second server from the plurality of servers associated with the publisher web service to the second subscriber web service according to the second resource allocation and the current loads of the plurality of servers.

11. The computer system of claim 9, wherein allocating a first set of resources from multiple resources of the publisher web service to the first subscriber web service according to the first resource allocation comprises assigning a first level of access from a plurality of levels of access of the publisher web service to the first subscriber web service according to the first resource allocation; and wherein allocating a second set of resources from the multiple resources of the publisher web service to the second subscriber web service according to the second resource allocation comprises assigning a second level of access from the plurality of levels of access of the publisher web service to the second subscriber web service according to the second resource allocation.

12. The computer system of claim 9, wherein allocating a first set of resources from multiple resources of the publisher web service to the first subscriber web service according to the first resource allocation comprises allocating a first bandwidth from a plurality of bandwidths of the publisher web service to the first subscriber web service according to the first resource allocation;
wherein allocating a second set of resources from the multiple resources of the publisher web service to the second subscriber web service according to the second resource allocation comprises allocating a second bandwidth from the plurality of bandwidths of the publisher web service to the second subscriber web service according to the second resource allocation.

13. The computer system of claim 9, wherein allocating a first set of resources from multiple resources of the publisher web service to the first subscriber web service according to the first resource allocation comprises allocating a first uptime from a plurality of uptimes of the publisher web service to the first subscriber web service according to the first resource allocation; and
wherein allocating a second set of resources from the multiple resources of the publisher web service to the second subscriber web service according to the second resource allocation comprises allocating a second uptime from the plurality of uptimes of the publisher web service to the second subscriber web service according to the second resource allocation.

14. The computer system of claim 9, wherein allocating a first set of resources from multiple resources of the publisher web service to the first subscriber web service according to the first resource allocation comprises allocating a first response time from a plurality of response times to the first subscriber web service according to the first resource allocation; and
wherein allocating a second set of resources from the multiple resources of the publisher web service to the second subscriber web service according to the second resource allocation comprises allocating a second response time from the plurality of response times to the second subscriber web service according to the second resource allocation.

15. The computer system of claim 9, wherein retrieving a first resource allocation associated with the first SLA type comprises retrieving the first resource allocation associated with the first SLA type from a resource allocation table, the resource allocation table associating each of a plurality of SLA types with one of a plurality of resources allocations; and
wherein retrieving a second resource allocation associated with the second SLA type comprises retrieving the second resource allocation associated with the second SLA type from the resource allocation table.

16. The computer system of claim 15, wherein each of the plurality of SLA types corresponds to a different fee paid to an operator of the publisher web service.

17. An optical disc, a magnetic storage device, or a solid state storage device having computer-executable instructions stored thereon which, when executed by a computer, cause the computer to:
receive a first request for information from a first subscriber web service in a composite service, the first request for information comprising a first service level agreement (SLA) type between a publisher web service in the composite service and the first subscriber web service and a first identifier of the first subscriber web service, the first SLA type corresponding to a first fee paid by an operator of the first subscriber web service to an operator of the publisher web service;
receive a second request for information from a second subscriber web service in the composite service, the second request for information comprising a second SLA type between the publisher web service and the second subscriber web service and a second identifier of the subscriber web service, the second SLA type corresponding to a second fee paid by an operator of the second subscriber web service to an operator of the publisher web service;
retrieve a first resource allocation associated with the first SLA type;
retrieve a second resource allocation associated with the second SLA type;
allocate a first set of resources from multiple resources of the publisher web service to the first subscriber web service according to the first resource allocation and the first identifier, the first set of resources configured to satisfy the first request for information;
allocate a second set of resources from the multiple resources of the publisher web service to the second subscriber web service according to the second resource allocation and the second identifier, the second set of resources configured to satisfy the second request for information:
routing the first request for information to the first server and
routing the second request for information to the second server.

* * * * *